(12) United States Patent
He et al.

(10) Patent No.: US 8,079,524 B2
(45) Date of Patent: Dec. 20, 2011

(54) IMAGING-BASED SCANNER INCLUDING BORDER SEARCHING FOR IMAGE ACQUISITION

(75) Inventors: Duanfeng He, South Setauket, NY (US); Eugene Joseph, Coram, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 242 days.

(21) Appl. No.: 12/627,389

(22) Filed: Nov. 30, 2009

(65) Prior Publication Data

US 2011/0127335 A1    Jun. 2, 2011

(51) Int. Cl.
  G06K 7/10    (2006.01)
  G06K 15/12    (2006.01)
  G06K 9/22    (2006.01)

(52) U.S. Cl. ......... 235/462.41; 235/462.42; 235/462.45; 235/472.01

(58) Field of Classification Search ............. 235/462.15, 235/462.41, 462.23, 462.45, 462.01, 379, 235/494, 462.42; 382/187, 181, 183
See application file for complete search history.

(56) References Cited

U.S. PATENT DOCUMENTS

| | | | |
|---|---|---|---|
| 5,331,176 A * | 7/1994 | Sant' Anselmo et al. | 235/462.42 |
| 5,367,578 A * | 11/1994 | Golem et al. | 382/183 |
| 5,628,003 A * | 5/1997 | Fujisawa et al. | 382/181 |
| 5,970,170 A * | 10/1999 | Kadashevich et al. | 382/187 |
| 6,354,737 B1 * | 3/2002 | Hufe et al. | 235/462.01 |
| 6,708,894 B2 * | 3/2004 | Mazaika | 235/494 |
| 6,742,708 B2 * | 6/2004 | Shaked et al. | 235/462.01 |
| 7,594,610 B2 * | 9/2009 | Walczyk et al. | 235/462.15 |
| 8,002,188 B2 * | 8/2011 | Wang | 235/462.45 |
| 8,011,575 B1 * | 9/2011 | Ramachandran et al. | 235/379 |
| 2003/0066890 A1 * | 4/2003 | Shaked et al. | 235/462.01 |
| 2004/0211837 A1 * | 10/2004 | Eisenberg et al. | 235/462.41 |
| 2005/0218231 A1 * | 10/2005 | Massieu | 235/462.23 |
| 2009/0140048 A1 | 6/2009 | Yu et al. | |

FOREIGN PATENT DOCUMENTS

| | | |
|---|---|---|
| EP | 2003599 | 12/2008 |
| WO | 2006078359 | 7/2006 |
| WO | 2006112866 | 10/2006 |

OTHER PUBLICATIONS

International Search Report and Written Opinion dated Feb. 23, 2011 in related case PCT/US2010/056292.

* cited by examiner

*Primary Examiner* — Thien Mai
(74) *Attorney, Agent, or Firm* — Nong-Qiang Fan

(57) ABSTRACT

A method utilizing an imaging-based bar code reader to identify a desired acquisition area within a captured image frame, the desired acquisition area including a target bar code and an extent of the desired acquisition area bounded by a border featuring: identifying a region of the captured image frame corresponding to an image of the target bar code; determining a reference point within the imaged target bar code; determining a reference point within an image of the desired acquisition area; searching for an image of the border of the desired acquisition area; identifying the imaged border of the desired acquisition area; and saving in memory a portion of the captured image frame corresponding to an image within the imaged border.

20 Claims, 7 Drawing Sheets

IMAGING-BASED SCANNER INCLUDING BORDER SEARCHING FOR IMAGE ACQUISITION

TECHNICAL FIELD

The present disclosure relates to a method and apparatus for image acquisition of a form utilizing an imaging-based bar code reader and, more specifically, to a method and apparatus for imaging the form utilizing the reader wherein the form is marked by a border and includes a target bar code of a known size and location within the form and an image processing system of the reader analyzes a captured image frame, relates a size and location of an imaged target bar code to the known size and location of the target bar code in the form and then searches for the border of the form to accurately determine the extent of the imaged form.

BACKGROUND

Existing portable barcode readers are hand held and can be moved with respect to a target barcode, to image and decode the bar code. Target objects, e.g., a product package that includes a target barcode, are brought within a field-of-view (FV) of the barcode reader by aiming a visible aiming pattern to strike the package at a region of the barcode. In stationary bar code readers the situation is reversed, i.e. the product is moved through a stationary field of view. The barcode reader typically provides an audible and/or visual signal to indicate the target barcode has been successfully imaged and decoded.

Both stationary and portable imaging-based barcode readers include at an imaging system that includes at least one camera assembly for capturing image frames of a field of view of the camera assembly. A typical camera assembly includes a pixel or sensor array having photosensitive elements such as a charge coupled device (CCD) or complementary metal oxide semiconductor (CMOS) device and an imaging lens assembly for projecting and focusing the field of view onto the sensor array. The camera assembly may be augmented with an illumination system having light emitting diodes (LEDs) or a cold cathode fluorescent lamp (CCFL) that directs illumination toward a target object. In certain cases, the target object may be a form or document, the extent of the form or document is sometimes referred to as a desired image acquisition area. The form or document may also include a target bar code within the confines of the form or document.

If the target object is within the field of view of the camera assembly, light reflected from the target object is focused through the imaging lens assembly such that focused light is concentrated onto the sensor array of photosensitive elements. The pixels of the sensor array are sequentially read out by image processing circuitry of the imaging system, generating an analog signal representative of a captured image frame. The analog signal is amplified by a gain factor and the amplified analog signal is digitized by an analog-to-digital converter. A digitized version of the captured image frame is stored in a memory, the digital values stored in memory for a captured image frame corresponding to light received during an exposure period by individual sensors or pixels of the sensor array.

The image processing system operates on the captured image frame to: 1) identify the imaged bar code within the captured image frame and attempt to decode the imaged bar code; and 2) identify the extent or bounds of the imaged form or document such that the portion of the captured image frame corresponding to the imaged form or document can be saved and/or subject to further processing, i.e. signature verification. Stated another way, in addition to identifying and decoding an imaged target bar code within a captured image frame, the image processing system additionally seeks to identify an area of the captured image frame (an array of pixels of the sensor array) that corresponds to or is congruent with the desired image acquisition area, that is, that corresponds to the form or document which was sought to be imaged.

One problem faced by designers of imaging-based bar code readers that are used for both bar code reading, that is, imaging and decoding a target bar code, and for image acquisition is that of accurately determining the extent of the imaged form or document. In conventional bar code readers that are used for image processing of a form wherein a bar code is located within the form, information is provided to the image processing system relating the size and location of the target bar code and the size and location of the form with respect to the target bar code. For example, information may be provided which relates the size and location of the form to a predetermined point of the target bar code, for example, the center of the target bar code. When the image processing system identifies the imaged target bar code within a captured image frame, the center of the imaged bar code can be identified and when combined with the previously supplied information regarding the size and location of the form with respect to the center of the target bar code, the image processing system can attempt to scale and extrapolate the extent or bounds of the imaged form within the captured image frame outwardly from the center of the imaged bar code.

The foregoing conventional method of scaling and extrapolating the extent or bounds of the imaged form is problematic. The size of the target bar code with respect to the size of the form may be greatly different, for example, the form may be 10 times (or more) the size of the target bar code within the form, thus, even small errors of a few pixels in determining the center of the imaged target bar code in a captured image frame will be magnified by a factor of 10 or more by the extrapolation process thereby causing unacceptably large errors in determining the extent or bounds of the imaged form. For example, if the corners of the imaged bar code are used as base points to predict or extrapolate where the corners of the imaged form will be, even small errors on the order of a few pixels with regard to the location of the corners of the imaged bar code will be greatly magnified when attempting to extrapolate out to the corners of the imaged form.

Thus, accurate identification of the extent or bounds of an imaged desired acquisition area, such as an imaged form, an imaged document, or an imaged label remains a challenge for designers of imaging-based bar code readers.

SUMMARY

An exemplary embodiment of the present disclosure includes an imaging-based system, apparatus and method of accurately identifying a desired acquisition area within a captured image frame wherein the desired acquisition area is a form, label or document or portion thereof, is bounded by a peripheral border and includes a target bar code within the desired acquisition area. An example embodiment of the present disclosure features a method of utilizing an imaging-based bar code reader to identify a desired acquisition area within a captured image frame, the desired acquisition area including a target bar code and an extent of the desired acquisition area bounded by a border, the imaging-based bar code reader including an imaging system for imaging a field of view and generating image frames of the field of view of the imaging system, a memory for storing a digitized representation of a captured image frame, and an image processing system operating on the digitized representation of the captured image frame, the steps of the method including: identifying a region of the captured image frame corresponding to an image of the target bar code; determining a reference point within the imaged target bar code utilizing information provided to the imaging system regarding a size of the target bar code; determining a reference point within an image of the desired acquisition area utilizing information provided to the imaging system regarding a location of the target bar code within the desired acquisition area and the determined reference point within the imaged target bar code; searching for an image of the border of the desired acquisition area utilizing information provided to the imaging system relating the size of the target bar code to a size of the desired acquisition area and the determined reference point within the imaged desired acquisition area; identifying the imaged border of the desired acquisition area; and saving in memory a portion of the captured image frame corresponding to an image within the imaged border.

Another example embodiment of the present disclosure features a method of utilizing an imaging-based bar code reader to identify a desired acquisition area within a captured image frame, the desired acquisition area including a target bar code and an extent of the desired acquisition area bounded by a border, the steps of the method including: identifying a region of the captured image frame corresponding to an image of the target bar code; determining information regarding a size of the target bar code and a location of the target bar code within the desired acquisition area and the determined reference point within the imaged target bar code and relating the size of the target bar code to a size of the desired acquisition area; determining a reference point within the imaged target bar code; determining a reference point within an image of the desired acquisition area; searching for an image of the border of the desired acquisition area; identifying the imaged border of the desired acquisition area; and saving in memory a portion of the captured image frame corresponding to an image within the imaged border.

Another example embodiment of the present disclosure features An imaging-based bar code reader for imaging a desired acquisition area, the desired acquisition area including a target bar code and an extent of the desired acquisition area bounded by a border, the reader including: an imaging system including a sensor array and an imaging lens assembly for imaging a field of view of the imaging system and projecting light from the field of view onto the sensor array, the imaging system generating image frames of the field of view of the imaging system; a memory for storing a digitized representation of a captured image frame; and an image processing system operating on the digitized representation of the captured image frame to: identify a region of the captured image frame corresponding to an image of the target bar code; utilize information regarding a size of the target bar code to determine a reference point within the imaged target bar code; utilize information regarding a location of the target bar code within the desired acquisition area and the determined reference point within the imaged target bar code to determine a reference point within an image of the desired acquisition area; utilize information relating the size of the target bar code to a size of the desired acquisition area and the determined reference point within the imaged desired acquisition area to search for an image of the border of the desired acquisition area; and identify the imaged border of the desired acquisition area and save in memory a portion of the captured image frame corresponding to an image within the imaged border.

BRIEF DESCRIPTION OF THE DRAWINGS

The foregoing and other features and advantages of the present disclosure will become apparent to one skilled in the art to which the present disclosure relates upon consideration of the following description of the invention with reference to the accompanying drawings, wherein like reference numerals, unless otherwise described refer to like parts throughout the drawings and in which.

DETAILED DESCRIPTION

The present disclosure relates to a system for more accurately imaging a desired image acquisition area, such as a form or a portion of a form. In particular, the system of the present disclosure comprises an apparatus and method to a method and apparatus for imaging a form utilizing an imaging-based bar code reader or scanner wherein the form is marked by a border and includes a target bar code of a known size and location within the form and an image processing system of the reader analyzes a captured image frame, relates a size and location of an imaged target bar code to the known size and location of the target bar code in the form and then searches for the border of the form to accurately determine the extent of the imaged form.

Figure 1:
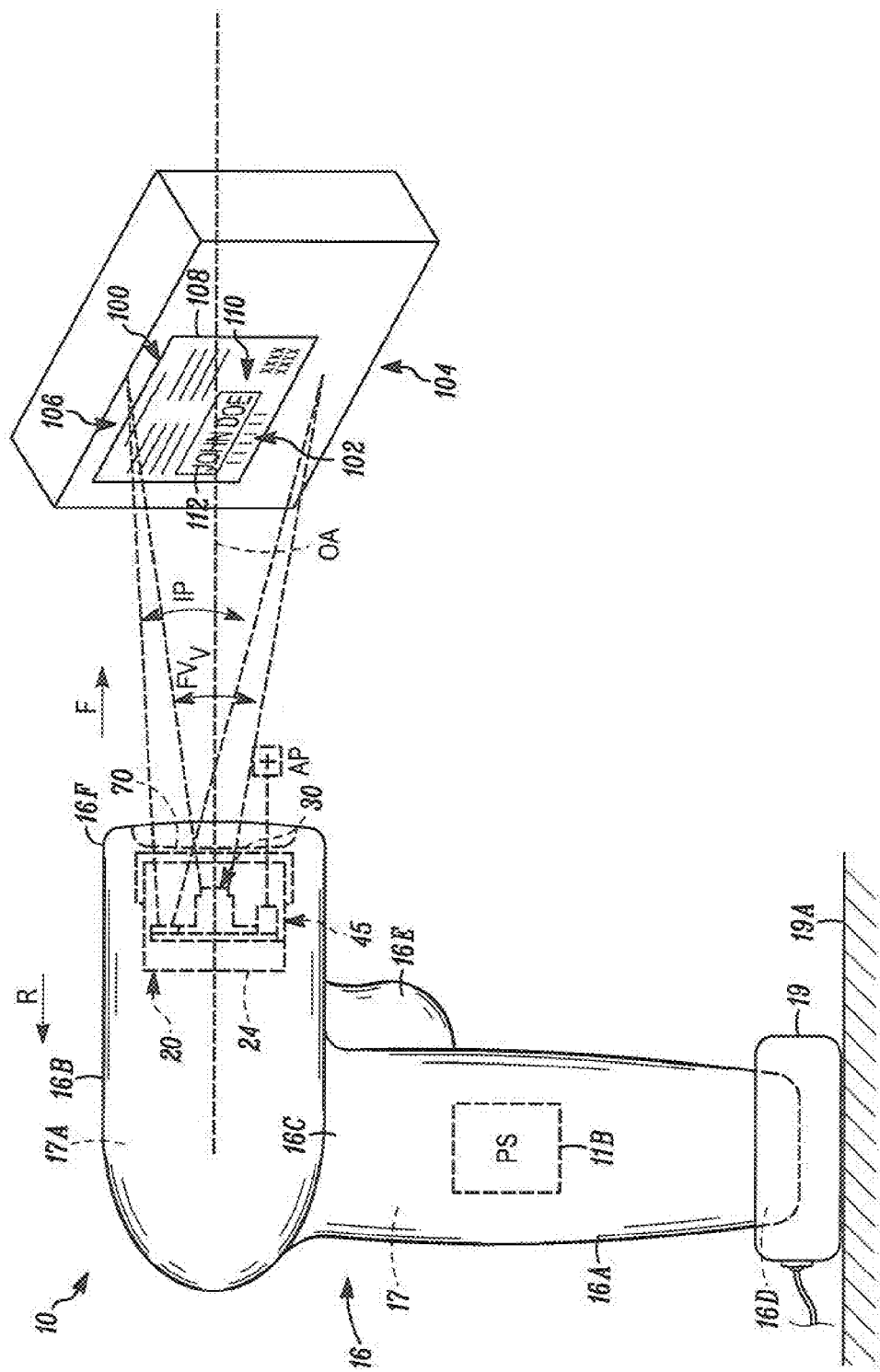
FIG. 1 is a schematic side elevation view of an exemplary embodiment of an imaging-based bar code reader of the present disclosure.

In one example embodiment illustrated in FIG. 1, an imaging-based bar code reader or scanner 10 is a hand-held, portable imaging-based imager and bar code reader that is adapted for use in imaging a target or desired image acquisition area 100 and reading a target bar code 102 within the desired acquisition area 100. The desired acquisition area 100 may be a form, a label, or a document or some portion thereof. A form 106, which is affixed to a package 104, is shown as an exemplary desired acquisition area 100 in the Figures. One use of the reader 10 is in the package delivery service wherein the package 104 being delivered includes the form 106 affixed to the package by the package delivery service. The form 106 includes an outline or peripheral border 108, a signature block region 110 for signature by the recipient acknowledging safe receipt of the package 104. The form 106 also includes a target bar code 102 printed within the extent of the form 106, that is, within the bounds of the border 108.

The target bar code 102 printed on the form 106 has encoded a unique identification number used by the package delivery service in identifying and tracking the package 104. After delivery of the package 104 and signature of the recipient in the signature block region 110, it is desired to use the reader 10 to: 1) Capture an image of the form 106, including the recipient's signature 112. The recipient's signature 112 may, for example, be subject to further processing, e.g., signature verification. 2) Capture an image 102' (shown schematically in FIG. 6) of the target bar code 102 on the form 106 to confirm receipt of the package 104 at its destination to the package delivery service and/or to the sender.

A first exemplary embodiment of an imaging-based bar code reader of the present invention is shown schematically at 10 in FIGS. 1-5. The bar code reader 10 includes an imaging system 12 and a decoding system 14 mounted in a housing 16. The reader 10 is capable of imaging target objects such as the form 18 and reading, that is, imaging and decoding, encoded indicia in the target bar code 14 printed on the form 18. Typically the target bar code will be in the form of a target 1D (e.g., Code 128) bar code or 2D (e.g., DataMatrix) bar code. As used herein, a target bar code will be understood to encompass both 1D and 2D bar codes.

The imaging system 12 is adapted to capture image frames of a field of view FV of the imaging system 12 and the decoding system 14 is adapted to decode encoded indicia within a captured image frame, i.e., an image 102' of the target bar code 102, hereinafter referred to as imaged target bar code 102'. The housing 16 supports circuitry 18 of the reader 10 including the imaging and decoding systems 12, 14 within an interior region 17 of the housing 16.

The imaging system 12 comprises a modular scan engine or imaging camera assembly 20 and associated imaging circuitry 22 supported within a camera housing 24. The camera assembly 20 includes a pixel or sensor array 28 and an imaging lens assembly 30. The imaging lens assembly 30 focuses or project light from a field of view FV extending in a direction forward F (FIG. 1) of the imaging lens assembly onto a light receiving portion 28a of the sensor array 28. The sensor array 28 comprises an array of photosensors or pixels and is positioned rearward or in a direction rearward R (FIG. 1) of the imaging lens assembly 30. The camera housing 24 additionally supports an illumination assembly 40 for projecting an illumination pattern IP toward the field of view FV to illuminate the field of view and an aiming pattern assembly 45 for projecting an aiming pattern AP toward the field of view FV to aid a user of the reader 10 in properly aiming the reader at the desired image acquisition area 100, namely, the form 106.

The illumination assembly 40 may include one or more LEDs 42 mounted on a front face 24b of the camera housing 24. The illumination pattern IP is generally congruent with an extent of the field of view FV. The aiming pattern assembly 45 includes a laser diode or laser chip 46 and a refractive or diffractive optical element 47 that facilitates projection of an aiming pattern AP for aligning the scan engine/camera assembly 20 with the desired acquisition area 100.

The camera assembly 20 may be modular in that the camera housing 24 may be removed or inserted as a unit into the reader housing 16, allowing the ready substitution of camera assemblies having different imaging characteristics, e.g., camera assemblies having different focal distances, working ranges, and fields of view. A working range WR (FIG. 3) is a distance range in front of or forward (in a direction F in FIG. 1) of the camera assembly 20 within which a target object of interest, such as the form 106, may be successfully imaging and within which a target bar code of interest, such as target bar code 102, may be successfully imaged and decoded.

The imaging lens assembly 30 may comprise a plurality of lenses 31 and/or one or more apertures 31a supported in a lens holder 32. The lens holder 32 may be supported in a support 33 affixed to a front surface of the PC board 24a. The imaging lens assembly 30 and the sensor array 28 define the field of view of the imaging system 12. The field of view FV is often referred to in angular terms, for example, a field of view that is 30° in the horizontal direction and 20° in the vertical direction would indicate the extent of the field of view FV projected onto the sensor array surface 28a. Optically, the field of view FV is a ratio of the size of the light receiving portion 28a of the sensor array 28 divided by a focal length of the imaging lens assembly 30.

In one exemplary embodiment, the imaging system 12 is a two dimensional (2D) imaging system and the sensor array 28 is a 2D sensor array. The sensor array 28 is enabled during an exposure period to capture an image of a target object of interest, such as the form 105, within the field of view FV of the imaging system 12. The field of view FV of the imaging system 12 is a function of both the configuration of the sensor array 28 and the imaging lens assembly 30 and the distance and orientation between the array 28 and the imaging lens assembly.

Housing 16

The housing 16 includes a gripping portion 16a adapted to be grasped by a user's hand and a forward or scanning head portion 16b extending from an upper part 16c of the gripping portion 16a. A lower part 16d of the gripping portion 16a is adapted to be received in a docking station 19 positioned on a substrate 19a such as a table or sales counter. The scanning head 16b supports the imaging system 12 within an interior region 17a (FIG. 4) of the scanning head 16b. As can best be seen in FIG. 2, looking from the front of the housing 16, the scanning head 16b is generally rectangular in shape and defines a horizontal axis H and a vertical axis V. The vertical axis V being aligned with a general extent of the gripping portion 16a.

Advantageously, the reader 10 of the present invention is adapted to be used in both a hand-held mode and a fixed position mode. In the fixed position mode, the housing 16 is received in the docking station 19 and the target object of interest such as the form 106 (FIG. 1) is brought within one of the field of view FV of the reader's imaging system 12 in order to have the reader 10 image the form 106 and image and read the target bar code 102 imprinted on the form 106. Advantageously, the imaging system 12 may include motion-triggered operation, that is, the imaging system is always on or operational such that it is ready to image and decode any target bar code presented to the reader 10 within a detection region. The detection region may correspond, for example, to a working range within a field of view FV of the imaging system. The docking station 19 is plugged into an AC power source and provides regulated DC power to circuitry 11 of the reader 10. Thus, when the reader 10 is in the docking station 19 power is available to keep the imaging system 12 on continuously. The docking station 19 may facilitate a wired connection between the reader 10 and, for example, a host computer.

In the hand-held mode, the housing 16 is removed from the docking station 19 so the reader 10 can be carried by a user and positioned such that the form 106 is within the the field of view FV of the imaging system 12. In the hand-held mode, imaging is instituted by the operator depressing a trigger 16e extending through an opening near the upper part 16c of the gripping portion 16a.

Imaging System 12

Figure 5:
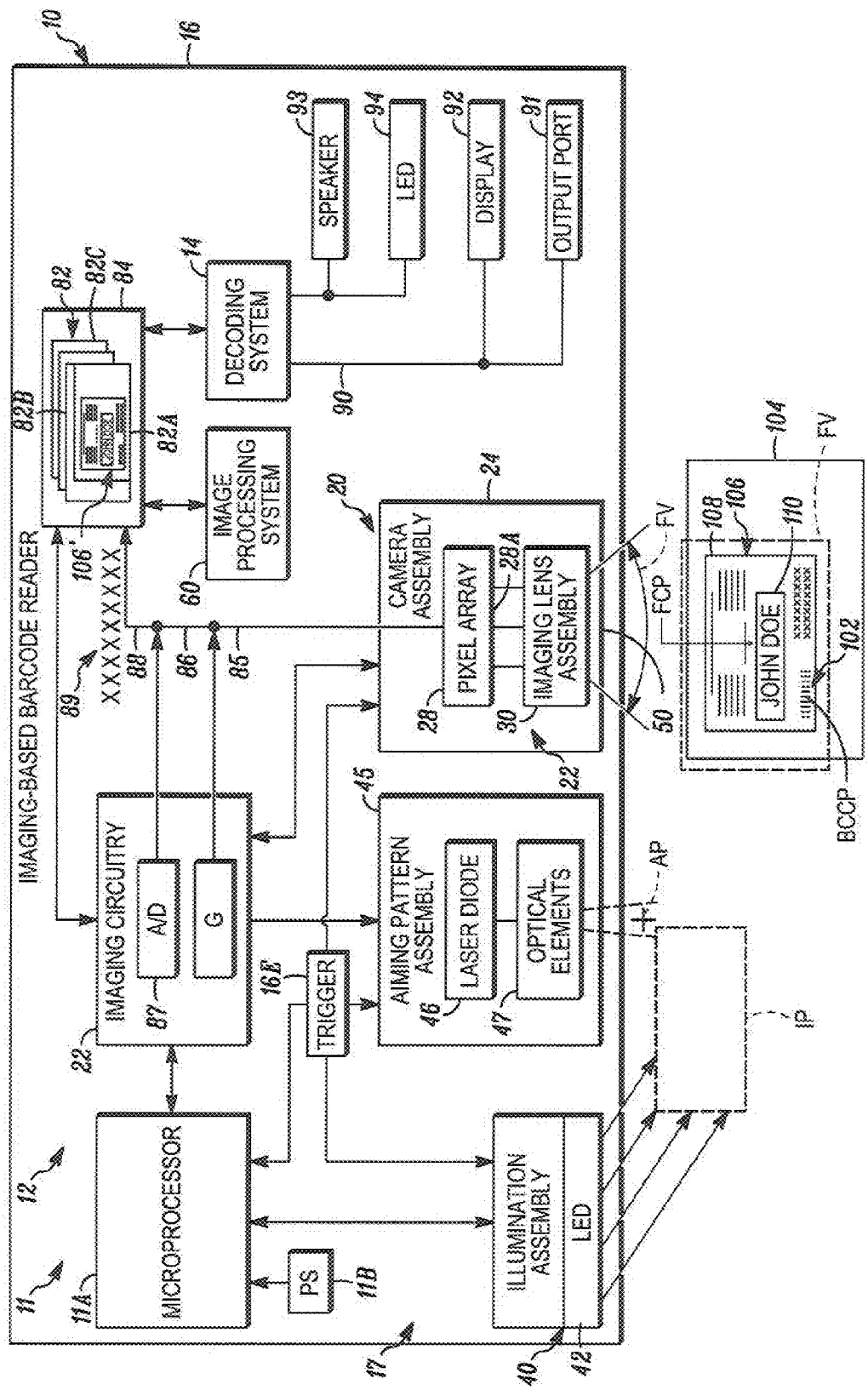
FIG. 5 is a schematic block diagram of the bar code reader of FIG. 1.

The imaging system 12 is part of the bar code reader circuitry 11 which operates under the control of a microprocessor 11a (FIG. 5). When removed from the docking station 19, power is supplied to the imaging and decoding systems 12, 14 by a power supply 11b. The imaging and decoding systems 12, 14 of the reader 10 may be embodied in hardware, software, electrical circuitry, firmware embedded within the microprocessor 11a or the modular camera assembly 20, on flash read only memory (ROM), on an application specific integrated circuit (ASIC), or any combination thereof as would be understood by one of skill in the art.

The imaging circuitry 22 may be disposed within, partially within, or external to the camera assembly housing 24. A back end of the housing 24 may be comprised of a printed circuit board 24a. The camera housing 24 is supported within the scanning head interior region 17a in proximity to a transparent window 70 (FIG. 4) defining a portion of a front wall 16f of the scanning head 16b. The window 70 is oriented such that its horizontal axis is substantially parallel to the scanning head horizontal axis H. The vertical axis of the window 70 is tilted slightly to avoid specula reflection.

Sensor Array 28

The imaging system 12 includes the sensor array 28 of the imaging camera assembly 20. The sensor array 28 comprises a charged coupled device (CCD), a complementary metal oxide semiconductor (CMOS), or other imaging pixel array, operating under the control of the imaging circuitry 22. In one exemplary embodiment, the sensor array 28 comprises a two dimensional (2D) mega pixel CMOS array with a typical size of the pixel array being on the order of 1280×1024 pixels. Each pixel is comprised of a photosensitive element or photosensor that receives light and stores a charge proportional to the intensity of the light received and then is periodically discharged to generate an electrical signal whose magnitude is representative of the charge on the photosensitive element during an exposure period.

Figure 2:
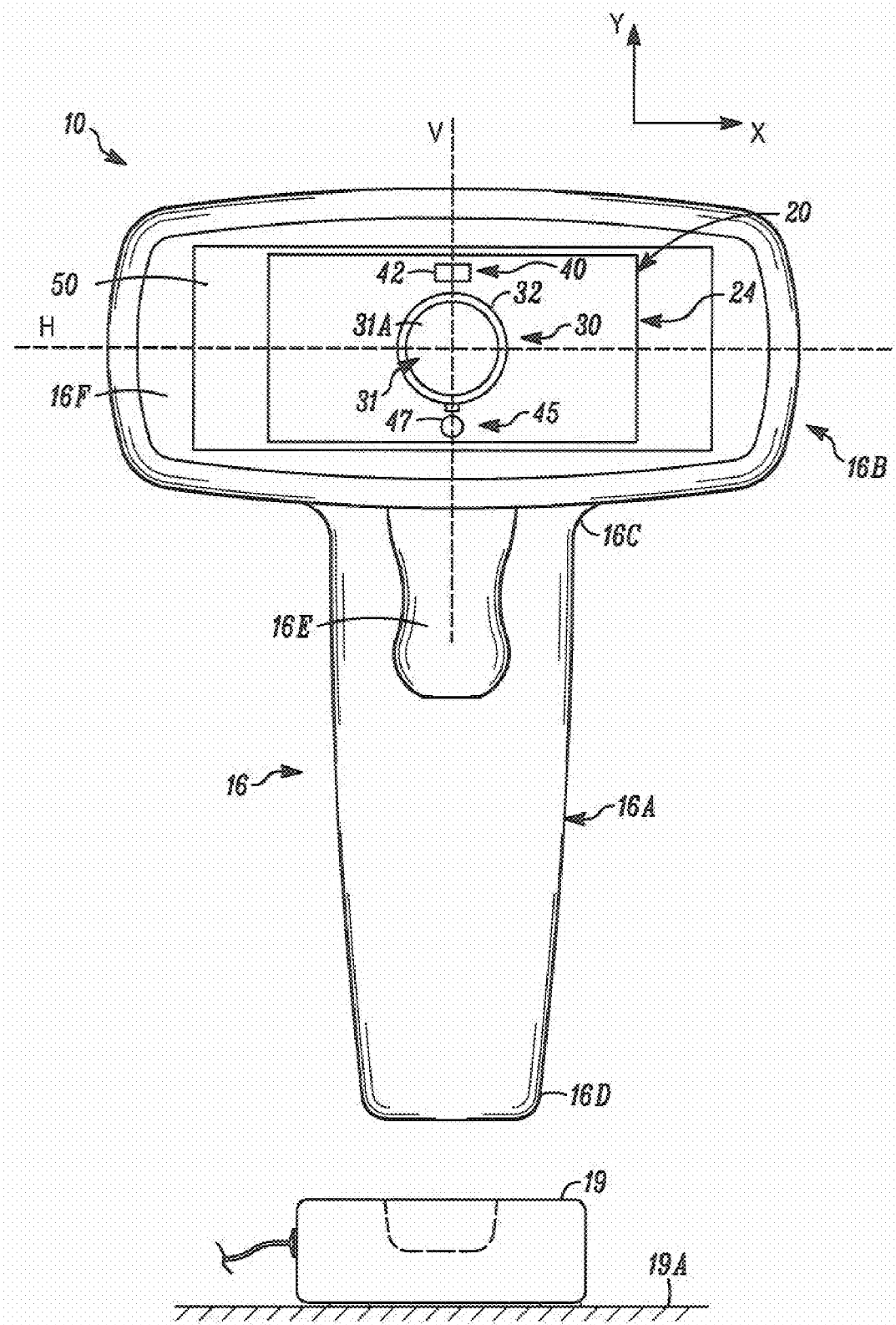
FIG. 2 is a schematic front elevation view of the bar code reader of FIG. 1.
Figure 3:
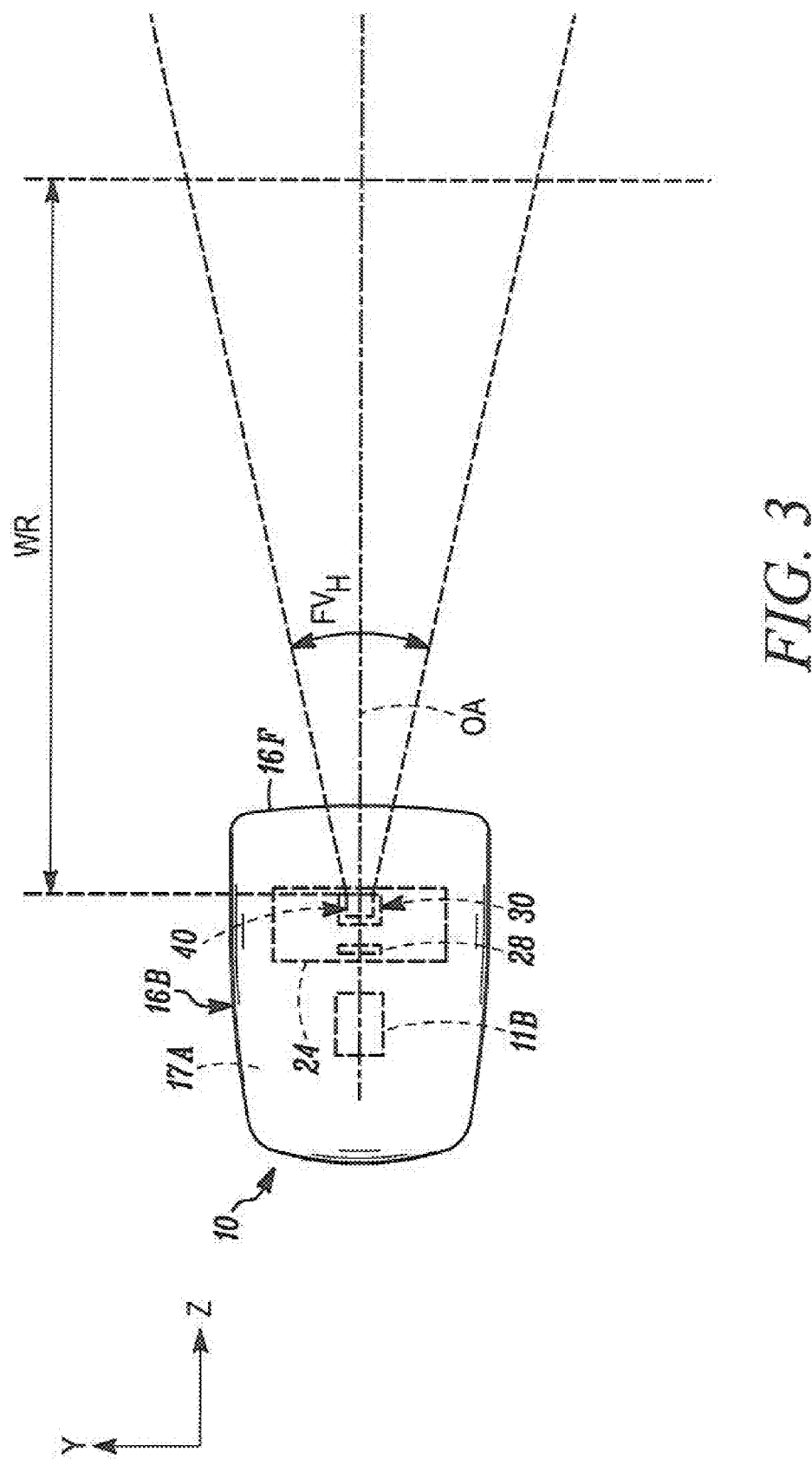
FIG. 3 is a schematic top plan view of the bar code reader of FIG. 1.
Figure 4:
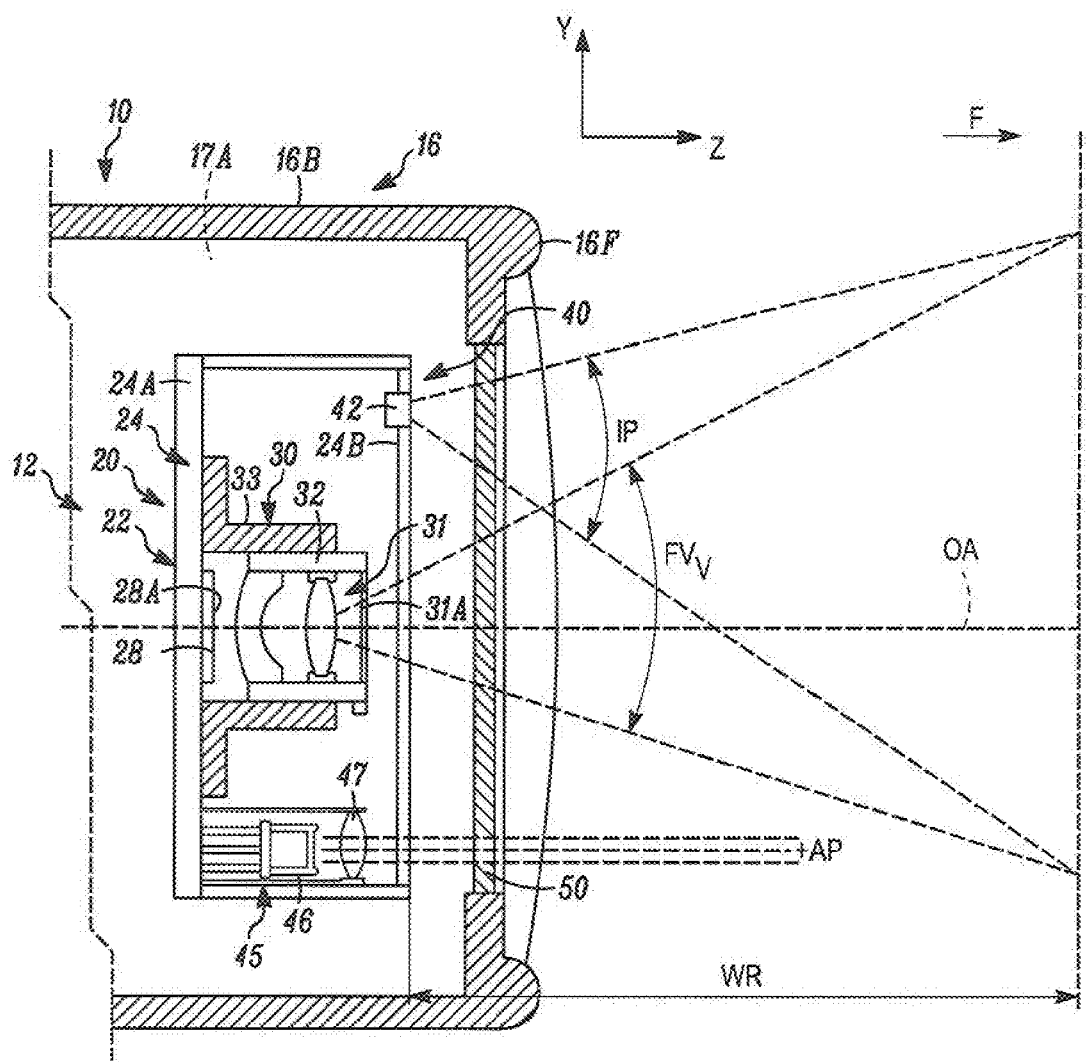
FIG. 4 is a schematic view partly in section and partly in side elevation of a camera assembly of an imaging assembly of the bar code reader of FIG. 1.

The illumination-receiving pixels of the sensor array 28 define the light receiving sensor array surface 28a (best seen in FIG. 4). The sensor array 28 is secured to the printed circuit board 24a, in parallel direction for stability. The sensor array surface 28a is substantially perpendicular to the optical axis OA of the imaging lens assembly 30. The pixels of the sensor array surface 28a are disposed substantially parallel to a plane defined by the X-Y axis (FIG. 2).

As can be seen in FIG. 4, the imaging lens assembly 30 focuses light reflected and scattered from the form 106 and the package 104 onto the sensor array surface 28a of the sensor array 28. Thus, the lens assembly 30 focuses an image of the field of view FV onto the array of pixels comprising the light receiving surface 28a of the sensor array 28. As can be seen in the Figures, the field of view FV is two dimensional and includes both a horizontal component $FV_H$ (FIG. 3) and a vertical component $FV_V$ (FIGS. 1 and 4).

Operation of Imaging and Decoding Systems 12, 14

Figure 6:
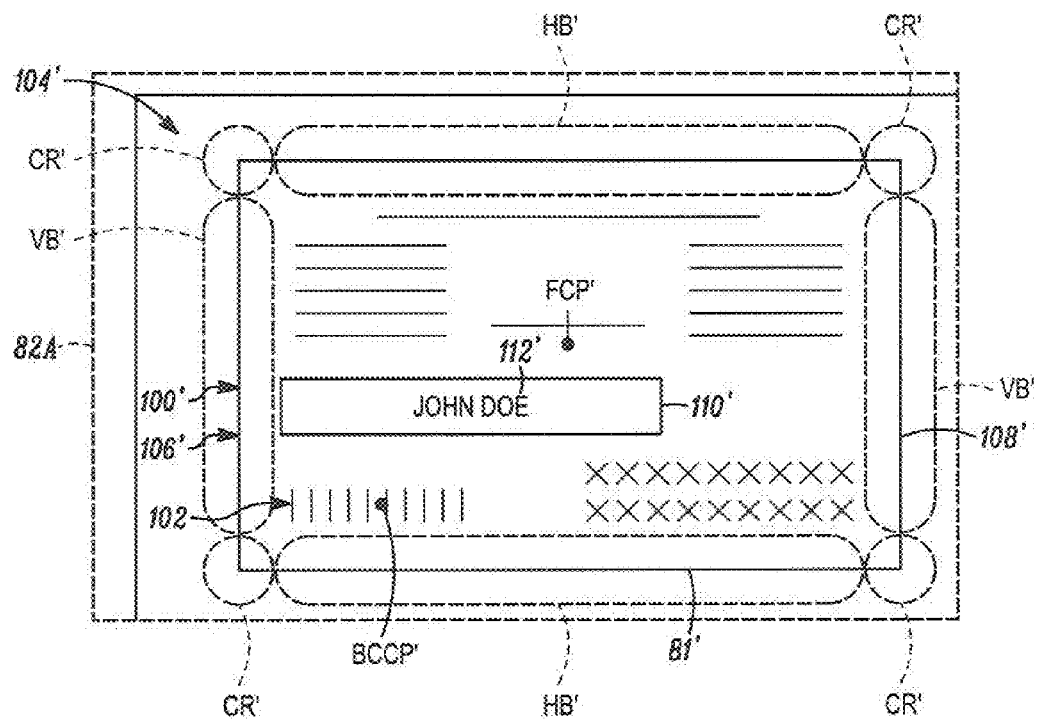
FIG. 6 is a schematic view of a captured image frame including an imaged form stored in a memory of the reader of FIG. 1 and operated on by an image processing system to identify a portion of the captured image frame corresponding to the imaged form.

When actuated to read a desired acquisition area such as the target form 106, the imaging system 12 captures a series of image frames, generally shown schematically as 82 in FIG. 5, which are stored in a memory 84. As can be seen schematically in FIG. 6, assuming the form 106 is within the field of view during an imaging session, each captured image frame of the series of image frames 82, e.g., image frame 82a, image frame 82b, image frame 83c, etc., includes a digital representation of an image of the form 106. As shown schematically in FIG. 6, for a given captured image frame, say image frame 82a, stored in memory 84, the digitized imaged representation of the form 106 will be referred to an the imaged form 106', the digitized imaged representation of the bar code 102 will be referred to as the imaged bar code 102', etc. As can be seen in FIG. 6, captured image frame 82a includes the imaged form 106', as well as an imaged portion 104' of the package 104 above and to the left of the form 106, that was within the field of view FV.

Electrical signals are generated by reading out of some or all of the pixels of the sensor array 28 after an exposure period. After the exposure time has elapsed, some or all of the pixels of sensor array 28 are successively read out thereby generating an analog signal 85 (FIG. 5). In some sensors, particularly CMOS sensors, all pixels of the sensor array 28 are not exposed at the same time, thus, reading out of some pixels may coincide in time with an exposure period for some other pixels.

The analog image signal 85 represents a sequence of photosensor voltage values, the magnitude of each value representing an intensity of the reflected light received by a photosensor/pixel during an exposure period. The analog signal 85 is amplified by a gain factor, generating an amplified analog signal 86. The imaging circuitry 22 further includes an analog-to-digital (A/D) converter 87. The amplified analog signal 86 is digitized by the A/D converter 87 generating a digitized signal 88. The digitized signal 88 comprises a sequence of digital gray scale values 89 typically ranging from 0-255 (for an eight bit image, i.e., $2^8=256$), where a 0 gray scale value would represent an absence of any reflected light received by a pixel during an exposure or integration period (characterized as low pixel brightness) and a 255 gray scale value would represent a very high intensity of reflected light received by a pixel during an exposure period (characterized as high pixel brightness).

The digitized gray scale values 89 of the digitized signal 88 are stored in the memory 84. The digital values 89 corresponding to a read out of the sensor array 28 constitute an image frame 82a, 82b, 82c, etc., which is representative of the image projected by the imaging lens assembly 30 onto the sensor array 28 during an exposure period.

The imaging system 12 of the present disclosure includes an image processing system 60 that analyzes captured image frames 82 to determine if a captured image frame, say image frame 82a, includes an image of a desired image acquisition area 100, such as an imaged form 106'. If so, the image processing system 60, utilizes the imaged bar code 102' within the imaged form 106', the imaged border 108', and certain information, as will be described below, to accurately determine the extent of the imaged form 106' within the captured image frame 82a and store that portion of the captured image frame 82a corresponding to the imaged form 106' in the memory 84. On a real time basis or periodically, some or all of the digitized data corresponding to the imaged form 106' may be transmitted via a data output port 91 to an external terminal or computer for further processing for example, verification that the imaged signature 112' in the imaged signature block 110' is a valid signature of an authorized employee of the package recipient.

Additionally, the decoding circuitry 14 operates on a portion of the captured image frame 82a corresponding to the imaged target bar code 102' and attempts to decode the imaged bar code. If the decoding is successful, decoded data 90, representative of the data/information encoded in the target bar code 102 may be stored in the memory 84 and/or output via the data output port 91. Additionally, some or all of the decoded data may be displayed to a user of the reader 10 via a display 92. Upon achieving a successful imaging of the desired imaging acquisition area 100, that is, an imaged desired acquisition area 100' or imaged form 106' of sufficient sharpness and clarity and including the entirety of the desired acquisition area 100, and a successful imaging and decoding of the imaged target bar code 102', a speaker 93 and/or an indicator LED 94 may activated by the bar code reader circuitry 13 to indicate to the user that the form 106 has been successfully imaged and the target bar code 102 has been successfully read. If imaging or decoding is unsuccessful, another image frame, e.g., image frame 82*b*, 82*c*, etc., is selected and the imaging processing and decoding processes are repeated until a imaging of the desired image acquisition area 100 and decoding of the target bar code 102 are achieved.

Operation of Image Processing System 60

Figure 7:
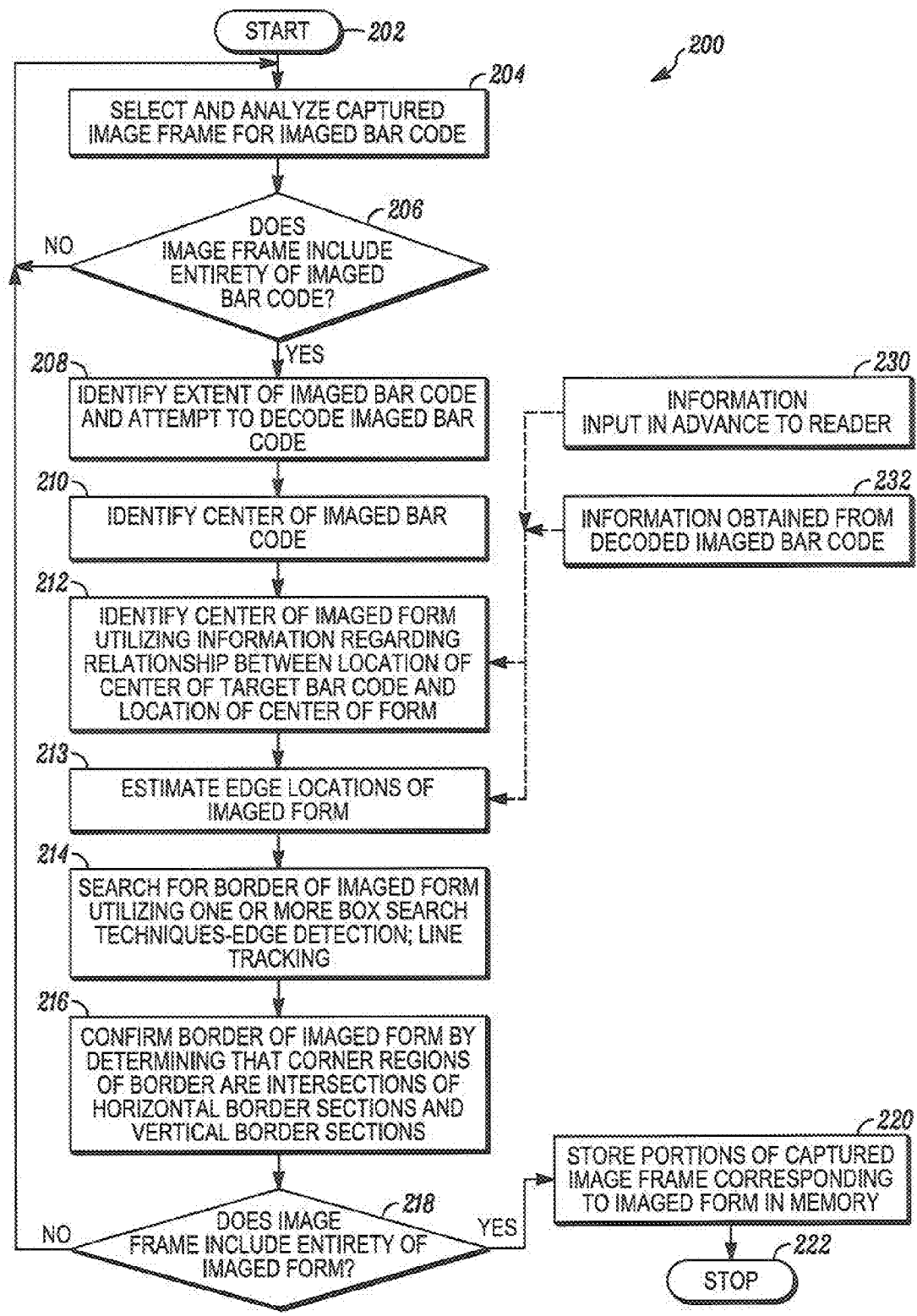
FIG. 7 is a schematic flow diagram showing selected steps of a method or process utilized by the image processing system to identify a portion of a captured image frame corresponding to an imaged form.

As discussed above, the image processing system 60 of the present disclosure sequentially analyzes captured image frames 82 generated by the camera assembly 20 during an imaging session and attempts to accurately identify an extent of the portion of a captured image frame, say image frame 82*a*, that corresponds to the image desired acquisition area 100', for example, imaged form 106'. As is shown in the schematic flow chart of FIG. 7, the process or method utilized by the image processing system 60 is shown generally at 200. The process is started or initiated at 202 with an imaging session that yields a sequence of captured image frames 82 whose digital representations are stored in the memory 84, as described above.

At step 204, the image processing system 60 selects and analyzes a captured image frame, say image frame 82*a*. At step 206, the image processing system 60 determines if the selected captured image frame 82*a* includes the entirety of the imaged target bar code 102'. If the selected captured image frame 82*a* does not include the entirety of the imaged target bar code 102', then another captured frame, say image frame 82*b*, is selected by the image processing system 60 from memory 84 and steps 204 and 206 are repeated.

If the selected captured image frame 82*a* does include the entirety of the imaged target bar code 102', then at step 208, the extent or bounds of the imaged target bar code 102' is determined, both as to the width of the imaged bar code 102' and the height of the imaged bar code, typically measured in terms of pixels of the sensor array light receiving surface 28*a*. To confirm that a region of the image frame 82*a* that is identified as a potential imaged bar code is, in fact, the imaged bar code 102', the decoding system 14 is utilized to attempt to decode the imaged bar code 102'. If decoding is successful, then it can be confirmed that the region identified as a potential imaged bar code is indeed the imaged bar code 102'. If it is not possible to successfully decode the image bar code 102', it is most likely that the imaged bar code 102' and the imaged form 106' are too blurred to utilize, either due to mis-focus of the camera assembly 20 or excessive motion of the form 106 during the imaging session. In either event, upon failure to decode the imaged bar code 102' another captured image frame is selected for analysis by the image processing system 60.

Additionally, at step 208, input or stored and made accessible to the image processing system 60 is information regarding the width and height of the physical bar code 102, typically measured in terms of modules. A module is unit of measurement that is based on the smallest bar or unit of encoded information in the bar code. The image processing system 60 must essentially correlate the size of the physical bar code 102 in modules (e.g., the bar code is 100 modules in width by 20 modules in height) to the size of the imaged original bar code 102' in memory 84 (e.g., the imaged bar code is 300 image pixels in width by 60 pixels in height).

The width of the physical bar code 102 in terms of modules may be found from the decoding process. The width dimension of the physical bar code 102 is measured in units of bar code modules instead of convention units of measurement such as inches or mm The measuring unit of the physical bar code 102 is defined in terms of modules, thus, conventional measurement is not required for measurement of the width, height, horizontal and vertical shift of the bar code. Because some symbologies, for example, a type of symbologies referred to as Delta Codes, such as Code 128, specify the exact mapping of the number of codeword characters and the number of modules for a bar code, the number of modules can be found in the decoding process. For some other symbologies, such as Code 39, this is not as straightforward. In these symbologies (generally called Binary Codes) the bar code width in modules can be estimated, but cannot be determined precisely through decoding.

Of course, this information could also be input to the reader circuitry 11 or pre-stored in advance of an imaging session if the width of the bar code in modules is a known constant. The height of the physical bar code 102 in terms of modules is typically pre-stored in the reader circuitry 11 through a parameter. The information regarding physical characteristics or specifications of the physical form 106 and the bar code 102 imprinted thereon is typically provided by the form designer. Alternately, the physical characteristics or specifications of the physical form 106 may be measured via conventional measurement techniques (i.e., ruler, calipers, etc.) using a sample of the physical form 106.

The information regarding the physical characteristics of the form 106 and bar code imprinted thereon may be input to the reader circuitry 11 in a number of different ways: 1) The information may be obtained via the imaging system 12 reading a parameter bar code followed by one or more numeric value bar codes. A parameter bar code indicates to the reader circuitry 11 that a parameter is to be changed, for example, parameters relating to the physical characteristics of the form 106 that will subsequently be imaged. Following reading of the parameter bar code, one or more numeric value bar codes may be read which provide the reader circuitry 11 and the image processing system 60 with information relating to the specific physical characteristics of the form 106. 2) The information may be obtained via the imaging system 12 reading a single 2D bar code which both indicates to the reader circuitry 11 that parameters relating to the physical characteristics of the form 106 are to be changed and the information regarding the specific physical characteristics of the form 106. 3) The information may be sent to the reader 10 via wired or wireless communications means. The communications means that connect the reader 10 to a host computer (not shown) may be used for this purpose. Alternately, a different communications scheme may be used, for example, while the reader 10 may be connected to a host computer through a wired connection, the reader 10 may also be connected to a back-office server via a wireless connection. 4) The information may be pre-packaged and pre-stored in the memory 84 or another reader circuitry memory. This is typical for a custom-built device that will be dedicated to reader a single type or limited group of forms. 5) The information may be input via input means provided on the reader 10, for example, a touch screen on the display 92 or a keypad (not shown) supported by the housing 16.

At step 210, the image processing system 60 determines a reference point of the imaged target bar code 102' using the information noted above regarding the size of the physical bar code 102 and data determined by the image processing system regarding the imaged bar code 102'. In one exemplary embodiment, the reference point may be geometric center or center point BCCP' of the imaged bar code 102'. Alternately, another reference point or points may be utilized, e.g., one or more corner points of the imaged bar code 102'.

At step 212, the image processing system 60 determines a reference point of the imaged form 106' using information regarding the derived input or stored and made accessible to the image processing system 60 regarding the relationship between the size and reference point or points (e.g., center point BCCP) of the physical bar code 102 and the size and reference point or points of the physical form 106. In one exemplary embodiment, the reference point of the physical form 106 may be a center point FCP of the form 106 and the determined reference point of the imaged form 106' may be the center point FCP' of the imaged form 106'. Input to the image processing system is information regarding the relationship between the location of the center point BCCP of the physical bar code 102 and the location of the center point FCP of the physical form 106. The information regarding physical characteristics regarding the relationship between the size and center point of the physical form 106 and the size and center point of the physical bar code 102 imprinted thereon is typically provided by the form designer. In the physical form 106, the center point FCP is typically assumed to be (0,0), a datum point, not a derived value. All other points are determined or measured with respect to the form center point FCP.

At step 213, the image processing system 60 estimates the edge locations of the imaged form 106'. These edge locations should correspond to the imaged border 108' of the imaged form 106'.

Once the center point FCP' of the imaged form 106' is determined and an estimate of the edge locations of the imaged form 106' is made, at step 214, the image processing system 60 undertakes a search for the imaged border 108' of the imaged form 106' utilizing one or more box search techniques such as edge detection and/or line/edge tracking. Common edge detection methods, such as those invented by Roberts, Sobel and Kirsch, can be found in various textbooks, for example, *Digital Image Processing*, Third Edition, by William K. Pratt, Wiley-Interscience, John Wiley & Sons, Inc., Scientific, Technical, and Medical Division, 1978, ISBN 0-471-37407-5, specifically, Chapters 15 (Edge Detection) and Chapter 17 (Image Segmentation), particularly, section 17.4.2 (Boundary Detection) (pages 566-579). A straightforward line detection method may be constructed by adapting the direction line detection method discussed in the aforementioned *Digital Image Processing* book at pages 481-482 of Chapter 15. The adaption is based on the fact that a line is formed with two parallel edges with opposite edge direction and within a certain vicinity of each other. The above-cited *Digital Image Processing* book is incorporated herein in its entirety by reference for any and all purposes.

For edge/line tracking, a threshold is dynamically determined from the edge strength measured in the image, where the edge strength is determined from any edge detection algorithm. The edge pixels above the threshold are tracked until the end (i.e., the end of the line constituting a side, for example a vertical side VB' or a horizontal side HB' of the imaged border 108'), or until the edge pixels start to move in a significantly different direction (i.e., a corner CR' of the imaged border 108' is encountered). For line tracking, a double-edge detection scheme (combining a positive and a negative edge in parallel and in close vicinity) is used to provide the base data, while the rest of the algorithm described above is used.

At step 216, assuming that horizontal and vertical sections or segments of the imaged border 108' are found in step 214, the image processing system 60 undertakes validation of the search for the imaged border 108' by identifying four aligned imaged border corner regions CR' which constitute intersections of imaged horizontal border sections HB' and vertical border sections VB' which are present in the imaged form 106'. If such a validation of the corner regions is not undertaken, horizontal border sections HB' and vertical border section VB' that are portions of non-border horizontal or vertical lines within the imaged form 106', for example, the horizontal and vertical lines defining the imaged signature block 110' could be mistaken as portions of the imaged border 108'.

At step 218, the image processing system 60 determines if the captured image frame 82a includes the entirety of the imaged form 106'. Stated another way, the image processing system 60 determines if an entirety of the imaged border 108' has been identified including the four quadralinearly aligned imaged corner regions CR'. If the entirety of the imaged border 108' cannot be identified, the process returns to step 204 where another captured image frame, say 82b, is selected for analysis. If the entirety of the imaged border 108' has successfully been identified, the process continues to step 220 wherein the image processing system 60 causes portions of the captured image frame 82a corresponding to the imaged form 106' to be stored in the memory 84 and/or subject to further processing such as: 1) deskewing of the imaged form 106' wherein the quadralinear region is resampled to become a rectangular region, base on a perspective model built from the imaged form's borders 108' (this is to account for parallax—the imaged form 106' within a captured image frame may be skewed if the reader 10 is not positioned to be aligned with and orthogonal to the form 106 during imaging); 2) normalization of the imaged form 106' wherein the different parts of the image are analyzed, the relative brightness made uniform and the image's contrast enhanced; and/or 3) image compression, such as using a known JPEG compression format, so that it is easier to store and transmit the imaged form 106'. At step 222, the process or method of accurately imaging the desired acquisition area 100, that is, form 106, terminates.

It should be understood that the information relating to characteristics of the physical form 106 and the physical bar code 102 (size, location relationship, center points, etc.) imprinted on the form are typically supplied by the form designer. Information regarding these characteristics may be input to the reader 10 prior to use of the reader 10 for imaging the form 106, as shown schematically in step 230 in FIG. 7 wherein the information regarding the physical form 106 and the physical bar code 102 is input in advance of an imaging session to the reader 10. In such an exemplary embodiment, wherein the characteristics of the form 106 and the bar code 102 are input to the reader 10 prior to imaging, it is not absolutely necessary to first decode the imaged bar code 102' prior to the image processing system 200 identifying the extent of the imaged form 106' and storing the relevant portion of the captured image frame 82a corresponding to the imaged form 106' in the memory 84. However, to provide for verification of that an identified region of the image frame 82a corresponding to the imaged bar code 102' indeed includes the imaged bar code 102', typically, decoding is undertaken to verify the presence of the imaged bar code.

Alternately, some or all of the characteristics of the form 106 and the bar code 102 may be encoded in the bar code 102. In such an exemplary embodiment, it would first be necessary to identify and decode the imaged bar code 102' in order to obtain the information necessary for the image processing system 60 to complete the image acquisition method outlined in the FIG. 7 flow chart. This is shown schematically in FIG. 7, at step 232 wherein some or all of the information regarding the physical bar code 102 and the physical form 106 is obtain from decoding the imaged bar code 102'. In such an exemplary embodiment, the decoding of the imaged bar code 102' must be undertaken prior to the image processing system 60 attempts to identified the extent of the imaged form 106'. It is the intent of the present disclosure to cover both such alternative embodiments or any combination thereof.

Without the use of the method 200 set forth above, attempts at accurately identifying that extent of an imaged desired acquisition area 100', such as the imaged form 106', would be subject to errors in extrapolation, that is, attempt to extrapolate the bounds of the form 106' from a center or other predetermined point of the imaged bar code 102' and imaged form 106' would be subject to extrapolation error. Such extrapolation error would be magnified if, as is often the case, the bar code 102 occupies a relatively small area compared to the total area or extent of the form 106 because very small errors in the identification of center points of the imaged bar code 102' and the imaged form 106' would be magnified by extrapolating from such inaccurate center points.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A method of utilizing an imaging-based bar code reader to identify a desired acquisition area within a captured image frame, the desired acquisition area including a target bar code and an extent of the desired acquisition area bounded by a border, the imaging-based bar code reader including an imaging system for imaging a field of view and generating image frames of the field of view of the imaging system, a memory for storing a digitized representation of a captured image frame, and an image processing system operating on the digitized representation of the captured image frame, the steps of the method comprising:

identifying a region of the captured image frame corresponding to an image of the target bar code;
determining a reference point within the imaged target bar code utilizing information provided to the imaging system regarding a size of the target bar code;
determining a reference point within an image of the desired acquisition area utilizing information provided to the imaging system regarding a location of the target bar code within the desired acquisition area and the determined reference point within the imaged target bar code;
searching for an image of the border of the desired acquisition area utilizing information provided to the imaging system relating the size of the target bar code to a size of the desired acquisition area and the determined reference point within the imaged desired acquisition area;
identifying the imaged border of the desired acquisition area; and
saving in memory a portion of the captured image frame corresponding to an image within the imaged border.

2. The method of claim 1 wherein the desired acquisition area is a form or label or a portion of a form, document or label.

3. The method of claim 1 wherein the reference point within the imaged target bar code is a geometric center point within the imaged target bar code and the reference point within the imaged desired acquisition area is a geometric center point within the imaged desired acquisition area.

4. The method of claim 1 wherein the step of identifying a region of the captured image frame corresponding to an image of the target bar code includes the substep of decoding the imaged target bar code.

5. The method of claim 1 wherein the information provided to the imaging system regarding the size of the target bar code includes information regarding a width and a height of the target bar code in units of modules of the target bar code.

6. The method of claim 1 wherein the information provided to the imaging system regarding the size of the desired acquisition area includes information regarding a width and a height of the desired acquisition area in units of modules of the target bar code.

7. The method of claim 1 wherein the imaging processing system in searching for the image of the border of the desired acquisition area utilizes one or more of the following techniques: edge detection and line tracking.

8. A method of utilizing an imaging-based bar code reader to identify a desired acquisition area within a captured image frame, the desired acquisition area including a target bar code and an extent of the desired acquisition area bounded by a border, the steps of the method comprising:

identifying a region of the captured image frame corresponding to an image of the target bar code;
determining information regarding a size of the target bar code and a location of the target bar code within the desired acquisition area and the determined reference point within the imaged target bar code and relating the size of the target bar code to a size of the desired acquisition area;
determining a reference point within the imaged target bar code;
determining a reference point within an image of the desired acquisition area;
searching for an image of the border of the desired acquisition area;
identifying the imaged border of the desired acquisition area; and
saving in memory a portion of the captured image frame corresponding to an image within the imaged border.

9. The method of claim 8 wherein the desired acquisition area is a form or label or a portion of a form, document, or label.

10. The method of claim 8 wherein the reference point within the imaged target bar code is a geometric center point within the imaged target bar code and the reference point within the imaged desired acquisition area is a geometric center point within the imaged desired acquisition area.

11. The method of claim 8 wherein the step of identifying a region of the captured image frame corresponding to an image of the target bar code includes the substep of decoding the imaged target bar code.

12. The method of claim 8 wherein the information regarding the size of the target bar code includes information regarding a width and a height of the target bar code in units of modules of the target bar code and the information regarding the size of the desired acquisition area includes information regarding a width and a height of the desired acquisition area in units of modules of the target bar code.

13. The method of claim 8 wherein the imaging processing system in searching for the image of the border of the desired acquisition area utilizes one or more of the following techniques: edge detection and line tracking.

14. An imaging-based bar code reader for imaging a desired acquisition area, the desired acquisition area including a target bar code and an extent of the desired acquisition area bounded by a border, the reader comprising:

an imaging system including a sensor array and an imaging lens assembly for imaging a field of view of the imaging system and projecting light from the field of view onto the sensor array, the imaging system generating image frames of the field of view of the imaging system;

a memory for storing a digitized representation of a captured image frame; and an image processing system operating on the digitized representation of the captured image frame to:

identify a region of the captured image frame corresponding to an image of the target bar code;

utilize information regarding a size of the target bar code to determine a reference point within the imaged target bar code;

utilize information regarding a location of the target bar code within the desired acquisition area and the determined reference point within the imaged target bar code to determine a reference point within an image of the desired acquisition area;

utilize information relating the size of the target bar code to a size of the desired acquisition area and the determined reference point within the imaged desired acquisition area to search for an image of the border of the desired acquisition area; and identify the imaged border of the desired acquisition area and save in memory a portion of the captured image frame corresponding to an image within the imaged border.

15. The imaging-based bar code reader of claim 14 wherein the desired acquisition area is a form or label or a portion of a form, document or label.

16. The imaging-based bar code reader of claim 14 wherein the reference point within the imaged target bar code is a geometric center point within the imaged target bar code and the reference point within the imaged desired acquisition area is a geometric center point within the imaged desired acquisition area.

17. The imaging-based bar code reader of claim 14 wherein the step of identifying a region of the captured image frame corresponding to an image of the target bar code includes the substep of decoding the imaged target bar code.

18. The imaging-based bar code reader of claim 14 wherein the information provided to the imaging system regarding the size of the target bar code includes information regarding a width and a height of the target bar code in units of modules of the target bar code.

19. The imaging-based bar code reader of claim 14 wherein the information provided to the imaging system regarding the size of the desired acquisition area includes information regarding a width and a height of the desired acquisition area in units of modules of the target bar code.

20. The imaging-based bar code reader of claim 14 wherein the imaging processing system in searching for the image of the border of the desired acquisition area utilizes one or more of the following techniques: edge detection and line tracking.

* * * * *

UNITED STATES PATENT AND TRADEMARK OFFICE
CERTIFICATE OF CORRECTION

| | | |
|---|---|---|
| PATENT NO. | : 8,079,524 B2 | |
| APPLICATION NO. | : 12/627389 | |
| DATED | : December 20, 2011 | |
| INVENTOR(S) | : He et al. | |

It is certified that error appears in the above-identified patent and that said Letters Patent is hereby corrected as shown below:

On the Title Page, in item (56), under "U.S. PATENT DOCUMENTS", in Column 2, Line 11, delete "Yu et al." and insert -- Yu Ming et al. --, therefor.

In Column 9, Line 67, delete "mm The" and insert -- mm. The --, therefor.

Signed and Sealed this
Fifteenth Day of January, 2013

David J. Kappos
*Director of the United States Patent and Trademark Office*